(12) United States Patent
Gao

(10) Patent No.: US 11,601,736 B2
(45) Date of Patent: Mar. 7, 2023

(54) TRANSMITTING METHOD, RECEIVING METHOD, TRANSMITTING DEVICE, AND RECEIVING DEVICE FOR INTERFACE DATA

(71) Applicant: SHENZHEN LENKENG TECHNOLOGY CO., LTD, Shenzhen (CN)

(72) Inventor: Binghai Gao, Shenzhen (CN)

(73) Assignee: SHENZHEN LENKENG TECHNOLOGY CO., LTD, Shenzhen (CN)

(*) Notice: Subject to any disclaimer, the term of this patent is extended or adjusted under 35 U.S.C. 154(b) by 41 days.

(21) Appl. No.: 17/331,645

(22) Filed: May 27, 2021

(65) Prior Publication Data

US 2022/0070558 A1 Mar. 3, 2022

(30) Foreign Application Priority Data

Sep. 2, 2020 (CN) .......................... 202010910261.2

(51) Int. Cl.
*H04Q 11/00* (2006.01)
*H04L 29/06* (2006.01)
*H04B 10/50* (2013.01)
*H04B 10/66* (2013.01)
*G06F 13/42* (2006.01)
(Continued)

(52) U.S. Cl.
CPC ..... *H04Q 11/0066* (2013.01); *G06F 13/4282* (2013.01); *H04B 10/50* (2013.01); *H04B 10/516* (2013.01); *H04B 10/66* (2013.01); *H04B 10/69* (2013.01); *H04L 69/16* (2013.01); *H04L 69/164* (2013.01); *G06F 2213/0042* (2013.01); *H04Q 2011/0073* (2013.01)

(58) Field of Classification Search
CPC ...... H04B 10/50; H04B 10/66; H04B 10/516; H04B 10/69; H04Q 11/0066; H04Q 2011/0073; G06F 13/4282; G06F 2213/0042
USPC ................................. 398/183, 202
See application file for complete search history.

(56) References Cited

U.S. PATENT DOCUMENTS 7,283,551 B1 * 10/2007 Algie .................... H04J 3/1682
370/468
2012/0106560 A1 * 5/2012 Gumaste ................ H04L 45/50
370/401
(Continued)

FOREIGN PATENT DOCUMENTS

CN 202841122 U * 3/2013
CN 109862364 A * 6/2019
CN 110995292 A * 4/2020

*Primary Examiner* — Li Liu
(74) *Attorney, Agent, or Firm* — Bayramoglu Law Offices LLC

(57) ABSTRACT

Disclosed are a transmitting method, a receiving method, a transmitting device and a receiving device for interface data. The transmitting method includes: interface data is obtained by the transmitting device via a first USB interface. The interface data is processed to obtain UDP packet by the transmitting device. The UDP packet is transmitted, by the transmitting device, to a first communication module. The UDP packet is transmitted to the receiving device or switch. By adopting the disclosure, ultra-low latency transmission of USB interface data between devices in long-distance transmission can be achieved.

12 Claims, 4 Drawing Sheets

(51) Int. Cl.
*H04L 69/164* (2022.01)
*H04L 69/16* (2022.01)
*H04B 10/69* (2013.01)
*H04B 10/516* (2013.01)

(56) References Cited

U.S. PATENT DOCUMENTS

| | | | |
|---|---|---|---|
| 2013/0194949 A1* | 8/2013 | Ruddick | H04L 43/028 370/252 |
| 2014/0201838 A1* | 7/2014 | Varsanyi | H04L 63/1425 726/23 |
| 2015/0067836 A1* | 3/2015 | Billa | H04L 41/28 726/22 |
| 2015/0231006 A1* | 8/2015 | Bhimavarapu | A61G 7/018 5/621 |
| 2017/0310398 A1* | 10/2017 | Masuda | G06F 13/36 |
| 2020/0245011 A1* | 7/2020 | Gao | H04N 21/234363 |

* cited by examiner

401 — Obtaining, by a transmitting device, the interface data via a first universal serial bus (USB) interface 402 — Obtaining, by the transmitting device, gigabit Ethernet media independent interface (MII) data based on the interface data 403 — Transmitting, by the transmitting device, the gigabit Ethernet MII data to a first electrical module

FIG. 4

501 — Obtaining, by a receiving device, a user datagram protocol (UDP) packet from a second communication module via an output interface of the second communication module 502 — Processing, by the receiving device, the UDP packet to obtain target interface data

FIG. 5

601 — Obtaining, by a receiving device, gigabit Ethernet media independent interface (MII) data by an output interface of a second electrical module 602 — Obtaining, by the receiving device, target interface data based on the gigabit Ethernet MII data

FIG. 6

TRANSMITTING METHOD, RECEIVING METHOD, TRANSMITTING DEVICE, AND RECEIVING DEVICE FOR INTERFACE DATA

CROSS REFERENCE TO RELATED APPLICATION

The present application claims priority to Chinese Patent Application Serial No. 202010910261.2 on Sep. 2, 2020, the disclosure of which is herein by incorporated by reference.

TECHNICAL FIELD

The disclosure relates to the technical field of network communication, and in particular to a transmitting method, a receiving method, a transmitting device, and a receiving device for interface data.

BACKGROUND

With the advancement of society and the development of science and technology, especially the development of Internet of Things (IoT) technology, the Internet of Things of various traditional devices has become a trend.

At present, the transmission of data between most traditional devices has high latency in the long-distance transmission, and the data loss is serious, for example, the transmission of data between a video source device such as a set-top box and a display device. The user experience is low.

SUMMARY

Based on the above problems and the shortcomings of the prior art, the disclosure provides a transmitting method, a receiving method, a transmitting device, and a receiving device for interface data, which can achieve ultra-low latency transmission of USB interface data between devices in long-distance transmission. The user experience is high.

In a first aspect, a transmitting method for interface data is provided. The transmitting method includes the following.

Interface data is obtained by a transmitting device via a first universal serial bus (USB) interface.

The interface data is processed by the transmitting device to obtain a user datagram protocol (UDP) packet.

The UDP packet is transmitted by the transmitting device to a first communication module.

In a second aspect, another transmitting method for interface data is provided, where the transmitting method comprises the following.

Interface data is obtained the by the transmitting device via the first USB interface.

Gigabit Ethernet MII data is obtained by the transmitting device based on the interface data, where the gigabit Ethernet MII data includes RGMII data, GMII data or SGMII data.

The gigabit Ethernet MII data is transmitted by the transmitting device to a first electrical module, where the first electrical module is configured to transmit the gigabit Ethernet MII data, the first electrical module includes a first physical transceiver, a first RJ-45 interface, and the first electrical module includes an electrical module with a transmission rate not lower than a first threshold.

In a third aspect, a receiving method for interface data is provided, where the receiving method includes the following.

A UDP packet is obtained from a second communication module via an output interface of the second communication module.

The UDP packet is processed by the receiving device to obtain a target interface data.

In a fourth aspect, another receiving method for interface data is provided, where the receiving device includes the following.

Gigabit Ethernet MII data is obtained by the receiving device via an output interface of a second electrical module, where the second electrical module is used to obtain the gigabit Ethernet MII data, and the gigabit Ethernet MII data comprising RGMII data, GMII data, or SGMII data.

The target interface data is obtained by the receiving device based on the gigabit Ethernet MII data.

In a fifth aspect, a transmitting device for interface data is provided, where the transmitting device includes a first memory and a first processor coupled to the first memory, the first memory is configured to store first application program instruction, and the first processor is configured to invoke the first application program instruction to perform the transmitting method for interface data as described in the first aspect.

In a sixth aspect, another transmitting device for interface data is provided, where the transmitting device includes a first USB interface, a USB chip and a first electrical module.

The first USB interface is configured to obtain interface data.

The USB chip is configured to obtain gigabit Ethernet MII data based on the interface data, where the gigabit Ethernet MII data includes RGMII data, GMII data or SGMII data.

The first electrical module is configured to receive the gigabit Ethernet MII data, where the first electrical module includes a first physical transceiver and a first RJ-45 interface, and the first electrical module includes an electrical module with a transmission rate not lower than a first threshold.

In a seventh aspect, a receiving device for interface data is provided, where the receiving device includes a second memory and a second processor coupled to the second memory, the second memory is configured to store second application program instruction, and the second processor is configured to invoke the second application program instruction to perform the receiving method for interface data described in the second aspect.

In an eighth aspect, another receiving device for interface data is provided, where the receiving device includes a second electrical module and a USB chip.

The second electrical module is configured to receive gigabit Ethernet MII data via the output interface of the second electrical module, and the gigabit Ethernet MII data includes RGMII data, GMII data or SGMII data.

The USB chip is configured to obtain target interface data based on the gigabit Ethernet MII data.

BRIEF DESCRIPTION OF THE DRAWINGS

In order to explain the technical solutions in implementations of the disclosure more clearly, the drawings used in the description of the implementations are briefly introduced below. Obviously, the drawings in the following description are some implementations of the disclosure. For ordinary technicians, other drawings can be obtained based on these drawings without paying creative work.

FIG. 4 is a schematic flow diagram of another transmitting method for interface data according to the disclosure.

FIG. 5 is a schematic flowchart of a receiving method for interface data according to the disclosure.

FIG. 6 is a schematic flowchart of another receiving method for interface data according to the disclosure.

DETAILED DESCRIPTION

The technical solutions in the disclosure will be described clearly and completely in combination with the accompanying drawings in the disclosure. Obviously, the described implementations are part of the implementations of the disclosure, but not all of the implementations. Based on the embodiment of the disclosure, all other embodiments obtained by those of ordinary skill in the art without making creative labor fall within the scope of protection of the disclosure.

Figure 1:
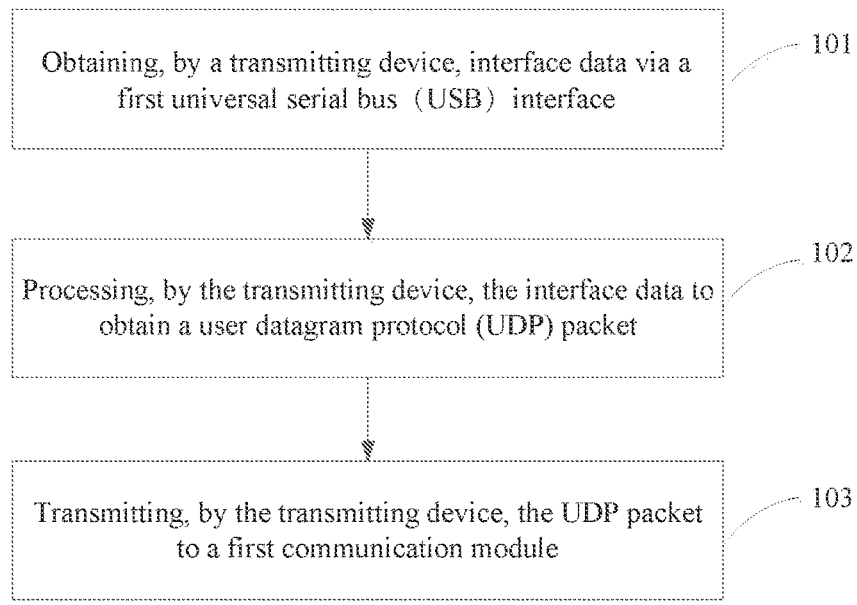
FIG. 1 is a schematic flowchart of a transmitting method for interface data according to the disclosure.

FIG. 1 is a schematic flowchart of a transmitting method for interface data according to the disclosure. As shown in FIG. 1, the transmitting method may include, but is not limited to, the following.

At block 101, the transmitting device obtains the interface data via a first USB interface.

According to an embodiment of the disclosure, the transmitting device obtains interface data via the first USB interface, which may include, but is not limited to, the following methods.

Method 1

The transmitting device can obtain (e.g., receive or read) the USB interface data from the preset device via a USB 2.0 interface of a USB chip (which can support a transfer rate of 480 Mbps), where the preset device can include, but is not limited to, storage devices (e.g., U disk, hard disk, floppy disk, magnetic tape, magnetic core memory, or magnetic bubble memory) and control devices (e.g., mouse, keyboard).

Method 2

The transmitting device can obtain USB3.0 interface data from the preset device via the USB3.0 interface of the USB chip.

Method 3

The transmitting device can obtain USB3.1 interface data from the preset device via the USB3.1 interface of the USB chip.

Method 4

The transmitting device can obtain the USB1.0 interface data from the preset device via the USB1.0 interface of the USB chip (which can support the transfer rate of 1.5 Mbps).

It should be noted that the interface data may include, but is not limited to, the following forms: transistor transistor logic (TTL) level signals, low-voltage differential signaling (LVDS) and other digital signals.

At block 102, the transmitting device processes the interface data to obtain the UDP packet.

According to an embodiment of the disclosure, the transmitting device processes the interface data to obtain the UDP packet, which may include, but is not limited to, the following process.

Process 1

The transmitting device processes the interface data by the physical transceiver (PHY) of the USB chip, which can obtain the PHY layer data, and outputs the PHY layer data via the gigabit Ethernet MII of the USB chip to obtain the gigabit Ethernet MII data.

Process 2

The transmitting device encapsulates the gigabit Ethernet MII data input to the first FPGA module by the first FPGA module based on the user datagram protocol (UDP) to obtain a UDP packet.

Gigabit Ethernet MII data may include, but is not limited to, reduced gigabit media independent interface (RGMII), gigabit media independent interface (GMII) data, or SGMII data, and The first FPGA module is a FPGA module integrated in the transmitting device.

The transmitting device encapsulates the gigabit Ethernet MII data input to the first FPGA module by the first FPGA module based on the user datagram protocol (UDP) to obtain the UDP packet.

The transmitting device adds a UDP protocol header and a UDP protocol tail to the gigabit Ethernet MII data to obtain a UDP packet comprising the second data, UDP protocol header, and UDP protocol tail, where the UDP protocol header or UDP protocol tail can contain control information such as destination address, source address, port number, and marker bits, respectively.

In some embodiments, the transmitting device processes the interface data to obtain UDP packet and may also include, but is not limited to, the following processes.

The transmitting device processes the interface data to obtain gigabit Ethernet MII data, and encapsulate the gigabit Ethernet MII data is to obtain a UDP packet by the first integrated circuit based on the UDP, where the first integrated circuit is an integrated circuit configured to encapsulate the gigabit Ethernet MII data based on the UDP.

Optionally, the first integrated circuit may also be configured to perform processing operations such as encoding the gigabit Ethernet MII data before encapsulating the gigabit Ethernet MII data based on the UDP.

At block 103, the transmitting device transmits the UDP packet to the first communication module.

The transmitting device transmits the UDP packet to the first communication module, which may include, but is not limited to the following.

The UDP packet is transmitted by the transmitting device to the first communication module based on the UDP.

It should be noted that after the transmitting device transmits the UDP packet to the first communication module, it may further include, but is not limited to, the following steps.

Step 1, the transmitting device may frame the UDP packet into superframes by a framing module of the first communication module.

Step 2, the transmitting device may transmit the superframe to a first optical module of the first communication module via a first Ethernet MAC unit of the first communication module.

The first optical module comprises a single-fiber single-mode optical module with a transmission rate no less than a first threshold or a single-fiber multimode optical module with a transmission rate no less than a first threshold.

Optionally, the first threshold may be 10 bps and is not limited here.

Step 3, after converting the superframe into an optical signal by the first optical module, the transmitting device may transmit the optical signal to the switch through the UDP.

Herein, the switch is used to forward the optical signal to a receiving device connected to the switch, where the switch may include a gigabit switch or a 10-gigabit switch, and the switch may also be a stacked switch.

The receiving device comprises a first receiving device and a second receiving device, where the first receiving device and the second receiving device have a second optical module integrated inside respectively.

The switch is configured to forward the optical signal to the first receiving device and the second receiving device respectively.

Figure 2:
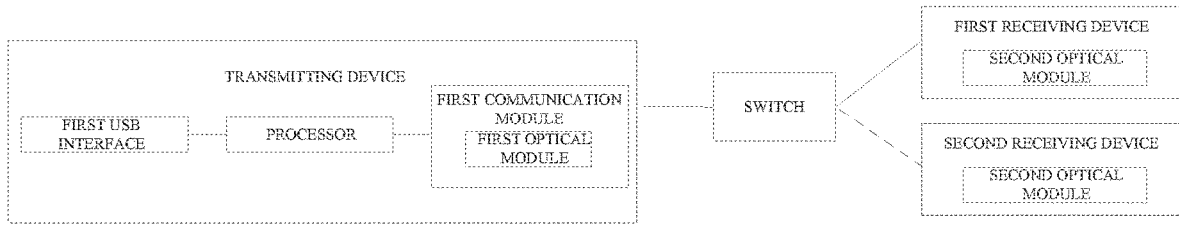
FIG. 2 is a schematic diagram of an application scenario according to the disclosure.

FIG. 2 is a schematic diagram of an application scenario.

As shown in FIG. 2, the transmitting device obtains the interface data from the preset device via the first USB interface, processes the interface data into the UDP packet by the processor, and frames the UDP packet into superframes by the framing module in the first communication module. The superframes are converted, by the transmitting device, into the optical signal by the first optical module, after the transmitting device transmit the optical signal to the switch through the UDP, the switch is configured to transmit the optical signal to the first receiving device integrated with the second optical module and the second receiving device integrated with the second optical module respectively.

Optionally, after converting the superframe into an optical signal by the first optical module, the transmitting device transmits the optical signal to the switch in addition, the transmitting device may further perform the following.

The optical signal is transmitted by the transmitting device to the receiving device by the first optical module.

When the receiving device comprises a first receiving device and a second receiving device, the optical signal is transmitted by the transmitting device to the receiving device, which may include the following.

The optical signal is transmitted by the transmitting device to the first receiving device and the second receiving device respectively based on the UDP by the first optical module.

Optionally, after the transmitting device transmits the UDP packet to the first communication module, the transmitting method further includes the following steps.

Step 1, the transmitting device may frame the UDP packet into a superframe by the framing module of the first communication module.

Step 2, after transmitting the superframe to the first electrical module of the first communication module via the first Ethernet MAC unit of the first communication module, the transmitting device may transmit the superframe to the switch through the UDP.

Here, the switch is configured to forward the superframe to the receiving device connected to the switch, the first electrical module comprises a first physical transceiver and a first RJ-45 interface, and the first electrical module comprises an electrical module with a transmission rate not lower than a first threshold.

The receiving device comprises a first receiving device and a second receiving device. Here, the first receiving device and the second receiving device are integrated with a second electrical module respectively.

The switch is configured to forward the superframe to the first receiving device and the second receiving device respectively.

Figure 3:
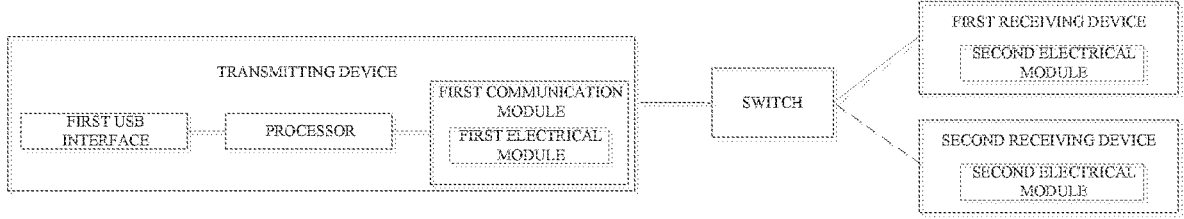
FIG. 3 is a schematic diagram of another application scenario according to the disclosure.

FIG. 3 is a schematic diagram of another application scenario.

As shown in FIG. 3, the transmitting device obtains the interface data from the preset device via the first USB interface, processes the interface data into the UDP packet by the processor, and frames the UDP packet into superframe by the framing module in the first communication module. The superframe is transmitted to the switch via the first electrical module, and then transmitted by the switch to the first receiving device and the second receiving device with the second electrical module integrated inside, respectively.

Optionally, after the transmitting device transmits the superframe to the first electrical module of the first communication module via the first Ethernet MAC unit of the first communication module, the transmitting method further comprise the following.

The transmitting device transmits the superframe to the receiving device by the first electrical module.

When the receiving device comprises a first receiving device and a second receiving device, the transmitting device transmits the superframe to the receiving device by the first electrical module, which may include the following.

The transmitting device transmits the superframe to the first receiving device and the second receiving device respectively by the first electrical module.

When the first electrical module comprises physical interface transceiver (PHY) and RJ-45 interface, specifically, the transmitting device may transmit the superframe to the PHY via the input interface (e.g., XF1, XAUX, RAUX) of the PHY, and it should be noted that the transmitting device may output, by the PHY, the superframe to the receiving device via the RJ-45 interface through the UDP.

Optionally, the transmitting device may frame the UDP packet into superframe by the framing module of the first communication module, and after transmitting the UDP packet to the first communication module, the transmitting device may further include the following steps.

The transmitting device may frame the UDP packet into superframe by the framing module of the first communication module, the transmitting device may transmit the superframe to the first electrical module of the first communication module through the first Ethernet MAC unit of the first communication module and transmits, by the first electrical module, the superframe to the switch through the UDP. At the same time, the transmitting device may transmit the superframe to the first optical module of the first communication module via the first Ethernet MAC unit of the first communication, convert the superframe into an optical signal by the first optical module, and transmit the optical signal to the switch through the UDP.

Optionally, the transmitting device may frame the UDP packet into superframe by the framing module of the first communication module. After the transmitting device transmits the UDP packet to the first communication module, the transmitting method further includes the following.

The transmitting device may frame the UDP packet into a superframe by the framing module of the first communication module, transmit the superframe to the first electrical module of the first communication module via the first Ethernet MAC unit of the first communication module, and transmit the superframe to the receiving device through the UDP. At the same time, the transmitting device may transmit the superframe to the first optical module of the first communication module via the first Ethernet MAC unit of the first communication module, convert the superframe into an optical signal by the first optical module, and transmit the optical signal to the receiving device through the UDP.

It should be noted that the UDP packet is encapsulated with USB interface data in addition, the superframe further includes the UDP packet encapsulated with multimedia data, the UDP packet encapsulated with RS232 interface data or the UDP packet encapsulated with UART interface data, etc.

In summary, the disclosure provides a transmitting method for interface data. The transmitting method includes the following. Interface data is obtained by a transmitting device via a first USB interface. The interface data is processed by the transmitting device to obtain the UDP packet. The UDP packet is transmitted by the transmitting device to a first communication module. The first communication module is configured to transmit the UDP packet to a receiving device or a switch through UDP. By adopting the disclosure, ultra-low latency transmission of USB interface data between devices in long-distance transmission can be achieved.

FIG. 4 is a schematic flowchart of another transmitting method for interface data according to the disclosure. As shown in FIG. 4, the transmitting method may include, but is not limited to, the following.

At block 401, the transmitting device obtains the interface data via the first USB interface.

It should be noted that the transmitting device obtains the interface data via the first USB interface as described in detail at block 101 of the embodiment of FIG. 1.

At block 402, the transmitting device obtains gigabit Ethernet MII data based on the interface data.

According to an embodiment of the disclosure, gigabit Ethernet MII data includes RGMII data, GMII data, or SGMII data.

It should be noted that the transmitting device outputs the interface data via the gigabit Ethernet MII to obtain the gigabit Ethernet MII data.

At block 403, the transmitting device transmits the gigabit Ethernet MII data to the first electrical module.

According to an embodiment of the disclosure, the first electrical module comprises a first physical transceiver and a first RJ-45 interface; the first electrical module further includes an electrical module with a transmission rate no less than a first threshold.

The transmitting device transmits the gigabit Ethernet MII data to the first electrical module, which may include the following.

The transmitting device may transmit the gigabit Ethernet MII data to the first electrical module via the first Ethernet MAC unit in the transmitting device.

It should be noted that the gigabit Ethernet MII data is processed into an analog signal by the first physical interface transceiver (PHY) in the first electrical module, and the analog signal is transmitted to the receiving device or switch via the first RJ-45 interface through the UDP via a cable connected to the first RJ-45 interface.

When the receiving device includes the first receiving device and the second receiving device, the transmitting device processes the gigabit Ethernet MII data into an analog signal by the first phy in the first electrical module, transmits the analog signal to the switch via the first RJ-45 interface based on the cable connected to the first RJ-45 interface, and transmits the gigabit Ethernet MII data to the first receiving device and the second receiving device respectively.

It should be noted that for definitions and descriptions that are not described in the embodiment of the disclosure, please refer to the embodiment in FIG. 1, which will not be repeated here.

FIG. 5 is a schematic flowchart of a receiving method for interface data according to the disclosure. As shown in FIG. 5, the receiving method may include, but is not limited to, the following.

At block 501, the receiving device obtains the UDP packet from a second communication module via the output interface of the second communication module.

According to an embodiment of the disclosure, the receiving device obtains the UDP packet from the second communication module, which may include, but is not limited to, the following methods.

Method 1

The receiving device converts the optical signal obtained from the switch into a superframe by a second optical module of the second communication module based on the UDP, where the second optical module comprises an optical module with a transmission rate not lower than a second threshold.

The receiving device transmits the superframe to the unframing module via a second Ethernet MAC unit of the second communication module.

The receiving device unframes the superframe into the UDP packet by the unframing module.

Method 2

The receiving device converts, by a second optical module of the second communication module, the optical signal obtained from the transmitting device into a superframe, where the second optical module includes an optical module with a transmission rate not lower than a second threshold.

The receiving device transmits the superframe to the unframing module via the second Ethernet MAC unit of the second communication module.

the receiving device unframes the superframe into the UDP packet by the unframing module.

Method 3

The receiving device obtains the superframe from the switch by a second electrical module of the second communication module based on the UDP, where the second electrical module includes a second physical interface transceiver (PHY) and a second RJ-45 interface, and the second electrical module further includes an electrical module with a transmission rate not lower than a second threshold.

The receiving device transmits the superframe to the unframing module via the second Ethernet MAC unit.

The receiving device unframes the superframe into the UDP packet by the unframing module.

Method 4

The receiving device obtains the superframe from the transmitting device by a second electrical module of the second communication module based on the UDP, where a second electrical module includes a second physical transceiver and a second RJ-45 interface, and a second electrical module includes an electrical module with a transmission rate not lower than a second threshold.

The receiving device transmits the superframe to the unframing module via the second Ethernet MAC unit.

The receiving device unframes the superframe into the UDP packet by the unframing module.

At block 502, the receiving device processes the UDP packet to obtain the target interface data.

According to an embodiment of the disclosure, the target interface data may include, but is not limited to, the following forms: transistor transistor logic (TTL) level signal, low-voltage differential signaling (LVDS), or other digital signals.

The receiving device processes the UDP packet to obtain the target interface data, which may include the following steps.

The receiving device decapsulates the UDP packet to obtain the gigabit Ethernet MU data based on the UDP by a second FPGA module, where the second FPGA module is a FPGA module integrated in the receiving device.

The receiver device uses the USB chip to output the gigabit Ethernet MII data to obtain the target interface data.

More specifically, the receiving device processes the gigabit Ethernet MII data input to the USB chip by the physical transceiver of the USB chip (e.g., the receiving device processes the gigabit Ethernet MII data into a PHY layer data, and processes the PHY layer data into target interface data in the form of LVDS signal) to obtain the target interface data.

It should be noted that the receiving device may also obtain the preset interface data via the second USB interface, process the preset interface data to obtain the preset UDP packet, and transmit the preset UDP packet to the transmitting device or the switch by the second communication module, where the switch is configured to forward the preset UDP packet to the transmitting device.

The receiving device processes the UDP packet to obtain the target interface data, which may also include the following steps.

The receiving device decapsulates, by the second integrated circuit, the UDP packet to obtain the gigabit Ethernet MII data based on the UDP, and processes the gigabit Ethernet MII data to obtain the target interface data, where the second integrated circuit may be an integrated circuit configured to decapsulate the UDP packet to obtain the gigabit Ethernet MII data based on the UDP. Optionally, the second integrated circuit may also be configured to perform processing operations such as decoding the target interface data after decapsulating the UDP packet based on the UDP protocol to obtain the gigabit Ethernet MII data.

FIG. 6 is a schematic flowchart of another receiving method for interface data according to the disclosure. As shown in FIG. 6, the receiving method may include, but is not limited to the following.

At block 601, the receiving device obtains the gigabit Ethernet MII data via the output interface of the second electrical module.

According to an embodiment of the disclosure, the second electrical module is configured to obtain gigabit Ethernet MII data from the transmitting device or switch, where the second electrical module comprises a second physical transceiver and a second RJ-45 interface, the second electrical module further includes an electrical module with a transmission rate no less than a second threshold, and the gigabit Ethernet MII data comprises RGMII data, GMII data or SGMII data.

The receiving device obtains the gigabit Ethernet MII data via the output interface of the second electrical module, which may include the following.

when the second electrical module comprises a physical interface transceiver (PHY) and a RJ-45 interface, specifically, the receiving device may obtain the gigabit Ethernet MII data via the output interface of the PHY (e.g., XF1, XAUX, RAUX).

At block 602, the transmitting device processes the gigabit Ethernet MII data to obtain the target interface data.

According to an embodiment of the disclosure, the target interface data may include, but is not limited to, the following: transistor transistor logic (TTL) level signal, low-voltage differential signaling (LVDS), or other digital signals.

The transmitting device obtains the target interface data based on gigabit Ethernet MII data, which may include the following.

The transmitting device inputs the gigabit Ethernet MII data to the USB chip via the gigabit Ethernet MII of the USB chip, and processes the gigabit Ethernet MII data by the PHY of the USB chip (e.g., the transmitting device processes the gigabit Ethernet MII data into PHY layer data, and processes the PHY layer data to obtain the target interface data in the form of LVDS) to obtain the target interface data.

It should be noted that for definitions and descriptions that are not described in the embodiment of the disclosure, please refer to the embodiment of FIG. 5, which will not be repeated here.

Figure 7:
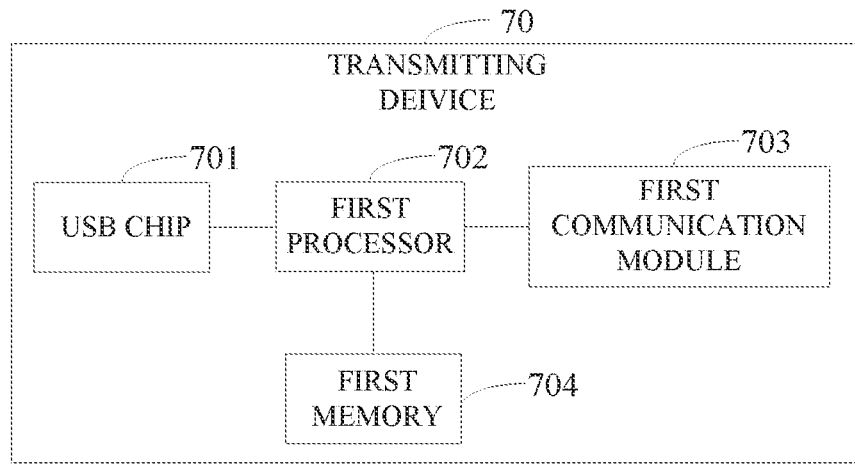
FIG. 7 is a schematic structural diagram of the transmitting device according to the disclosure.

A transmitting device that may be configured to perform the transmitting method described in the embodiment of FIG. 1 is provided. The transmitting device 70 shown in FIG. 7 may be configured to perform what is described in the embodiment of FIG. 1, and the transmitting device 70 may be the transmitting device of FIG. 7. As shown in FIG. 7, the transmitting device 70 may include a USB chip 701, a first processor 702, a first communication module 703, and a first memory 704.

The first memory 704 may be configured to store first application program instruction.

The first processor 702 may be configured to invoke the first application program instruction stored in the first memory 702, which may perform the following.

The interface data is obtained from a preset device via the first USB interface in the USB chip 701, and the preset device may include, but is not limited to, a storage device as well as a control device.

The first processor 702 is specifically configured to call the second application program instruction to perform the following.

The interface data is processed to obtain gigabit Ethernet MII data. The gigabit Ethernet MII data is encapsulated by the first FPGA module based on the UDP to obtain UDP packet, where the gigabit Ethernet MII data includes RGMII data, GMII data, or SGMII data.

The interface data is processed to obtain gigabit Ethernet MII data. The gigabit Ethernet MII data is encapsulated to obtain the UDP packet by a first integrated circuit based on the UDP, where the first integrated circuit may be an integrated circuit configured to encapsulate the gigabit Ethernet MII data based on the UDP.

The first processor 702 can further be configured to call the second application program instruction to perform the following.

The UDP packet is framed into superframe by the frame module of the first communication module 703.

The superframe is transmitted to the first optical module of the first communication module 703 via the first Ethernet MAC unit of the first communication module 703.

The superframe is converted into an optical signal by the first optical module. The optical signal is transmitted to the switch based on the UDP. The switch is configured to forward the optical signal to a receiving device connected to the switch, where the first optical module includes an optical module with a transmission rate not lower than a first threshold.

the first communication module 703 is configured to frame the UDP packet into superframe by the frame module of the first communication module 703, transmit the superframe to the first electrical module of the first communication module 703 via the first Ethernet MAC unit of the first communication module 703; and the superframe is transmitted, by the first electrical module, to the switch based on the UDP, where the first electrical module comprises a first physical transceiver and a first RJ-45 interface, and the first electrical module includes an electrical module with a transmission rate not lower than a first threshold.

The first optical module is configured to convert the superframe into an optical signal, and transmit the optical signal to the receiving device based on the UDP.

The first Ethernet MAC unit of the first communication module 703 is configured to transmit the superframe to the first electrical module of the first communication module 703, and the first electrical module is configured to transmit the superframe to the receiving device.

It should be understood that transmitting device 70 is only one example provided in the embodiment of the disclosure, and the transmitting device 70 may have more or fewer components than shown, may combine two or more components, or may have different configurations of components implemented.

It will be understood that specific implementations of the functional components included in the transmitting device 70 of FIG. 7 may be referred to the embodiment of FIG. 1 and will not be repeated here.

Figure 8:
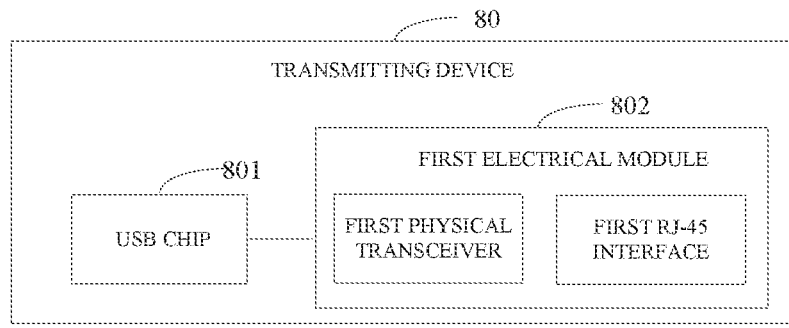
FIG. 8 is a schematic structural diagram of another transmitting device according to the disclosure.

A transmitting device that may be configured to implement the transmitting method described in the embodiment of FIG. 4 is provided. The transmitting device 80 shown in FIG. 8 may be configured to perform what is described in the embodiment of FIG. 1, and the transmitting device 80 may be the transmitting device of FIG. 8. As shown in FIG. 8, the transmitting device 80 may include a USB chip 801 and a first electrical module 802.

Where the USB chip 801 may be configured to obtain interface data via the first USB interface, and configured to output the gigabit Ethernet MII data based on the interface data; where the gigabit Ethernet MII data includes RGMII data, GMII data or SGMII data.

The first electrical module 802 can be configured to receive gigabit Ethernet MII data. The first electrical module 802 comprises a first physical transceiver and a first RJ-45 interface, and the first electrical module 802 comprises an electrical module with a transmission rate no less than a first threshold.

It should be noted that for the definitions and descriptions that are not described in the embodiment of the disclosure, please refer to the embodiment in FIG. 7, which will not be repeated here.

Figure 9:
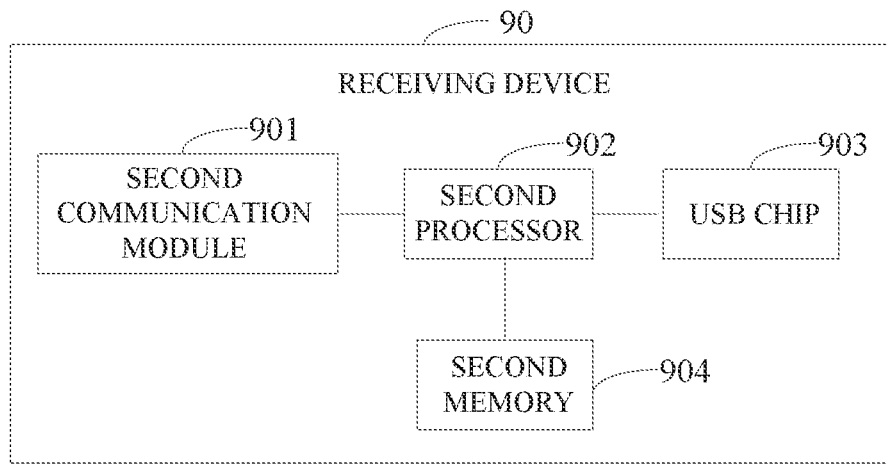
FIG. 9 is a schematic structural diagram of the receiving device according to the disclosure.

A receiving device may be configured to implement the receiving method described in the embodiment of FIG. 5 is provided. The receiving device 90 shown in FIG. 9 may be configured to perform what is described in the embodiment of FIG. 5, and the receiving device 90 may be the receiving device of FIG. 9. As shown in FIG. 9, the receiving device 90 may include a second communication module 901, a second processor 902, a USB chip 903, and a second memory 904.

The second memory 904 may be configured to store second application program instruction.

The second processor 902 may be configured to invoke the second application program instruction stored in the second memory 904 to perform the following.

The UDP packet is obtained from the second communication module 901 via the output interface of the second communication module 901.

The UDP packet is processed to obtain the target interface data.

The second processor 902 configured to obtain the UDP data packet from the second communication module is configured to: convert the optical signal obtained from a switch into a superframe by a second optical module of the second communication module based on UDP; wherein the second optical module comprises an optical module with a transmission rate not lower than a second threshold;

transmit the superframe to a unframing module via a second Ethernet media access control (MAC) unit of the second communication module; and unframe the superframe into the UDP data packet by a unframing module.

The second processor 902 configured to obtain the UDP packet from the second communication module is configured to:

convert the optical signal obtained from the transmitting device into the superframe by the second optical module of the second communication module based on the UDP; wherein the second optical module comprises an optical module with a transmission rate not lower than a second threshold;

transmit the superframe to the unframing module through the second Ethernet MAC unit of the second communication module; and unframe the superframe into the UDP packet by the unframing module.

The second processor 902 configured to obtain the UDP packet from the second communication module is configured to:

obtain the superframe from a switch by a second electrical module of the second communication module; wherein the second electrical module comprises a second physical interface transceiver (PHY) and a second RJ-45 interface; and the second electrical module comprising an electrical module with a transmission rate not lower than a second threshold;

transmit the superframe to the unframing module through the second Ethernet MAC unit; and unframe the superframe into the UDP data packet by the unframing module.

The second processor 902 configured to obtain the UDP packet from the second communication module is configured to:

obtain the superframe from the transmitting device by the second electrical module of the second communication module; wherein the second electrical module comprises a second physical transceiver and a second RJ-45 interface; and the second electrical module comprises an electrical module with a transmission rate not lower than a second threshold;

transmit the superframe to the unframing module via the second Ethernet MAC unit; and unframe the superframe into the UDP data packet by the unframing module.

The second processor 902 may further be configured to process the preset interface data to obtain the preset UDP packet.

The preset UDP packet is transmitted to the transmitting device or the switch by the second communication module

901, where the switch is configured to forward the preset UDP packet to the transmitting device.

The second processor 902, specifically, may also be configured to perform the following.

The UDP packet is decapsulated by the second FPGA module of the second processor 902 based on the UDP to obtain gigabit Ethernet MII data, or the UDP packet is decapsulated by the second integrated circuit of the second processor 902 based on the UDP to obtain gigabit Ethernet MII data.

The USB chip 903 can be configured to process the gigabit Ethernet MII data obtained by the second processor 902 to obtain the target interface data.

It should be understood that receiving device 90 is only one example provided by embodiment of the disclosure, and the receiving device 90 may have more or fewer components than shown, may combine two or more components, or may have different configurations of components implemented.

It will be understood that specific implementation of the functional components included in the receiving device 90 of FIG. 9 may be referred to the embodiment of FIG. 5 and will not be repeated here.

Figure 10:
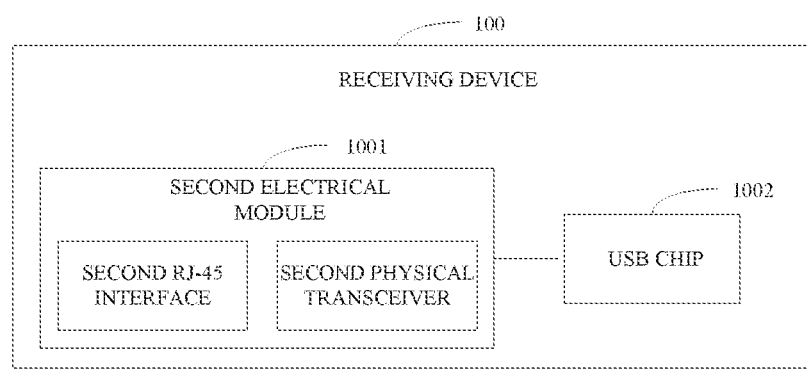
FIG. 10 is a schematic structural diagram of another receiving device according to the disclosure.

Another receiving device that may be used to implement the receiving method described in the embodiment of FIG. 6 is provided. The receiving device 100 shown in FIG. 10 may be configured to implement what is described in the embodiment of FIG. 6, and the receiving device 100 may be the receiving device of FIG. 10. As shown in FIG. 10, the receiving device 100 may comprise a second electrical module 1001 and a USB chip 1002.

The second electrical module 1001 is configured to receive gigabit Ethernet MII data based on the output interface of the second electrical module 1001, and the gigabit Ethernet MII data, includes RGMII data, GMII data, or SGMII data.

The USB chip 1002 is configured to obtain target interface data based on gigabit Ethernet MII data.

It should be noted that for the definitions and descriptions not described in the embodiment of the disclosure, please refer to the embodiment in FIG. 9, which will not be repeated here.

Those ordinary skilled in the art may realize that the modules and algorithm steps of each example described in combination with the implementations of the disclosure can be performed by electronic hardware, computer software, or a combination thereof. In order to clearly explain the interchangeability of hardware and software, the composition and steps of each example have been described generally in terms of functions in the above description. Whether these functions are performed in hardware or software depends on the specific application and design constraints of the technical solution. Professional technicians can use different methods to implement the described functions for each specific application, but such implementation should not be considered to be beyond the scope of the disclosure.

Those skilled in the art can clearly understand that, for the convenience and brevity of the description, the specific working processes of the devices and modules described above can refer to the corresponding processes in the foregoing implementations of method, and are not repeated here.

In the several implementations provided in the disclosure, it should be understood that the disclosed equipment, device, and method may be implemented in other ways. For example, to describe the composition and steps of each example. Whether these functions are executed in hardware or software depends on the specific application of the technical solution and design constraints. Professional technicians can use different methods to implement the described functions for each specific application, but such implementation should not be considered beyond the scope of this disclosure.

The implementations of device and equipment described above are only schematic. For example, the division of the modules is only a logical function division. In actual implementation, there may be another division manner. For example, multiple modules or components may be combined or integrated into another device, or some features can be ignored or not be implemented. In addition, the displayed or discussed mutual coupling or direct coupling or communication connection may be indirect coupling or communication connection via some interfaces, equipment, devices or modules, and may also be electrical, mechanical or other forms of connection.

The modules described as separate components may or may not be physically separated, and the components displayed as modules may or may not be physical modules, may be located in one place, or may be distributed on multiple network modules. Some or all of the modules may be selected according to actual needs to achieve the objects of the solutions in the implementations of the disclosure.

In addition, each functional module in each implementation of the disclosure may be integrated into one processing module, or each module may exist separately physically, or two or more modules may be integrated into one module. The above integrated modules may be implemented in the form of hardware or software functional modules.

When the integrated module is implemented in the form of a software functional module and sold or used as an independent product, it can be stored in a computer-readable storage medium. Based on this understanding, the technical solution of the disclosure essentially or a part that contributes to the existing technology, or all or part of the technical solution may be embodied in the form of a software product. The computer software product is stored in a storage medium which includes instructions to enable a computer device (which may be a personal computer, a server, or a network device, etc.) to perform all or part of the steps of the method described in the implementations of the disclosure. The foregoing storage media include: U-disks, mobile hard disks, read-only memory (ROM), random access memory (RAM), magnetic disks, or optical disks and other media that can store program codes.

The above is only a specific implementation of the disclosure, but the scope of protection of the disclosure is not limited to this. Any person skilled in the art can easily think of various equivalent modifications or replacements within the technical scope disclosed in the disclosure which should be covered by the protection scope of the disclosure. Therefore, the protection scope of the disclosure shall be subject to the protection scope of the claims.

What is claimed is:

1. A transmitting method for interface data, comprising:
    obtaining, by a transmitting device, interface data via a first universal serial bus (USB) interface;
    processing, by the transmitting device, the interface data to obtain a user datagram protocol (UDP) packet; and
    transmitting, by the transmitting device, the UDP packet to a first communication module;
    wherein processing, by the transmitting device, the interface data to obtain the UDP packet comprises:
        processing, by the transmitting device, the interface data to obtain gigabit Ethernet media independent interface (MII) data; and encapsulating, via a first FPGA module or by a first integrated circuit, the gigabit Ethernet MII data based on the UDP protocol to obtain the UDP packet; wherein the gigabit Ethernet MII data comprises reduced gigabit media independent interface (RGMII) data, GMII interface data or SGMII interface data; and after transmitting, by the transmitting device, the UDP packet to the first communication module, framing, by the transmitting device, the UDP packet into a superframe by a framing module of the first communication module;

transmitting, by the transmitting device, the superframe to a first optical module of the first communication module via a first Ethernet media access control (MAC) unit of the first communication module;

converting, by the transmitting device, the superframe into an optical signal by the first optical module; and transmitting, by the transmitting device, the optical signal to a switch through the UDP;

wherein the switch is configured to forward the optical signal to a receiving device connected to the switch, and the first optical module comprises an optical module with a transmission rate not lower than a first threshold; or transmitting, by the transmitting device, the superframe to a first electrical module of the first communication module via a first Ethernet MAC unit of the first communication module; and transmitting, by the transmitting device, the superframe to a switch through the UDP;

wherein the switch is configured to forward the superframe to a receiving device connected to the switch, and the first electrical module comprises a first physical interface transceiver (PHY) and a first RJ-45 interface; the first electrical module comprises an electrical module with a transmission rate not lower than a first threshold.

2. The transmitting method according to claim 1, wherein obtaining, by the transmitting device, the interface data via the first USB interface comprises:

obtaining, by the transmitting device, the interface data from a preset device via a USB 2.0 interface;

obtaining, by the transmitting device, the interface data from the preset device via a USB 3.0 interface;

obtaining, by the transmitting device, the interface data from the preset device via a USB 3.1 interface; or, obtaining, by the transmitting device, the interface data from the preset device via a USB 1.0 interface.

3. The transmitting method according to claim 1, wherein the receiving device comprises a first receiving device and a second receiving device, the switch is configured to forward the optical signal to the first receiving device and the second receiving device, respectively.

4. The transmitting method according to claim 1, wherein the receiving device comprises a first receiving device and a second receiving device, the switch is configured to forward the superframe to the first receiving device and the second receiving device, respectively.

5. The transmitting method according to claim 1, wherein the transmitting method further comprises:

after the converting, by the transmitting device, the superframe into an optical signal by the first optical module, transmitting, by the transmitting device, the optical signal to the receiving device by the first optical module.

6. The transmitting method according to claim 5, wherein the receiving device comprises a first receiving device and a second receiving device; and transmitting, by the transmitting device, the optical signal to the receiving device by the first optical module comprises;

transmitting, by the transmitting device, the optical signal to the first receiving device and the second receiving device respectively by the first optical module.

7. The transmitting method according to claim 1, wherein the transmitting method further comprises:

after the transmitting, by the transmitting device, the superframe to the first electrical module of the first communication module via the first Ethernet MAC unit of the first communication module, transmitting, by the transmitting device, the superframe to the receiving device by the first electrical module.

8. The transmitting method according to claim 7, wherein the receiving device comprises a first receiving device and a second receiving device; and transmitting, by the transmitting device, the superframe to the receiving device by the first electrical module comprises:

transmitting, by the transmitting device, the superframe to the first receiving device and the second receiving device respectively by the first electrical module.

9. A transmitting device for interface data, comprising: a first memory configured to store first application program instruction; and a first processor coupled to the first memory and configured to invoke the first application program instruction to execute the transmitting method for interface data according to any one of claims 1-2 and 3-8;

a first USB interface, a USB chip, and a first electrical module;

wherein the first USB interface is integrated into the USB chip;

the first USB interface is used to acquire interface data;

the USB chip is used to obtain Gigabit Ethernet MII data based on the interface data; wherein the Gigabit Ethernet MII data includes: RGMII data, GMII data or SGMII data;

the first electrical module is used to receive the Gigabit Ethernet MII data; wherein the first electrical module includes: a first physical transceiver and a first RJ45 interface; wherein the first electrical module includes: transmission rate Electrical modules not below a first threshold.

10. A receiving method for interface data, comprising:

obtaining, by a receiving device, a user datagram protocol (UDP) packet from a second communication module via an output interface of the second communication module;

processing, by the receiving device, the UDP packet to obtain target interface data;

wherein obtaining, by the receiving device, the UDP packet from the second communication module comprises:

obtaining, by the receiving device, an optical signal from a switch or transmitting device based on the UDP protocol by a second optical module of the second communication module;

converting, by the receiving device, the optical signal into a superframe by a second optical module of the second communication module based on UDP;

wherein the second optical module comprises an optical module with a transmission rate not lower than a second threshold;

transmitting, by the receiving device, the superframe to a unframing module via a second Ethernet media access control (MAC) unit of the second communication module; and unframing, by the receiving device, the superframe into the UDP packet by a unframing module; or obtaining, by the receiving device, the superframe from a switch or transmitting device by a second electrical module of the second communication module; wherein the second electrical module comprises a second physical interface transceiver (PHY) and a second RJ-45 interface; and the second electrical module comprising an electrical module with a transmission rate not lower than a second threshold;

transmitting, by the receiving device, the superframe to the unframing module through the second Ethernet MAC unit; and unframing, by the receiving device, the superframe into the UDP packet by the unframing module;

wherein processing, by the receiving device, the UDP packet to obtain the target interface data comprises:
decapsulating, by the receiving device, the UDP packet by a second FPGA module or a second integrated circuit based on the UDP to obtain gigabit Ethernet MII data;

processing, by the receiving device, the gigabit Ethernet MII data to obtain the target interface data;

wherein the gigabit Ethernet MII data comprises RGMII data, GMII data, or SGMII data.

11. The receiving method according to claim 10, wherein the receiving method further comprising:
obtaining, by the receiving device, preset interface data via a second USB interface;

processing, by the receiving device, the preset interface data to obtain a preset UDP packet; and transmitting, by the receiving device, the preset UDP packet to the transmitting device or the switch via the second communication module; wherein the switch is configured to forward the preset UDP packet to the transmitting device.

12. A receiving device for interface data, comprising:
a second memory configured to store a second application program instruction; and a second processor coupled to the second memory and configured to invoke the second application program instructions to execute the receiving method for interface data according to any one of claims 10 and 11;

a second electrical module and a USB chip;

wherein the second electrical module is configured to receive Gigabit Ethernet MII interface data via an output interface of the second electrical module; wherein the Gigabit Ethernet MII data includes: RGMII data, GMII data or SGMII data;

the USB chip is used to obtain target interface data based on the Gigabit Ethernet MII interface data.

\* \* \* \* \*